UNITED STATES PATENT OFFICE.

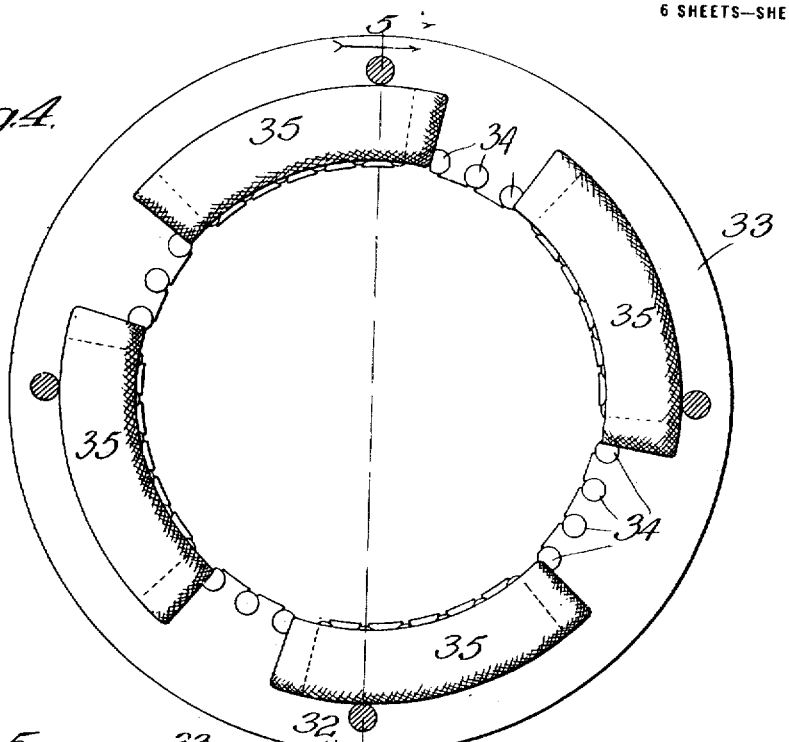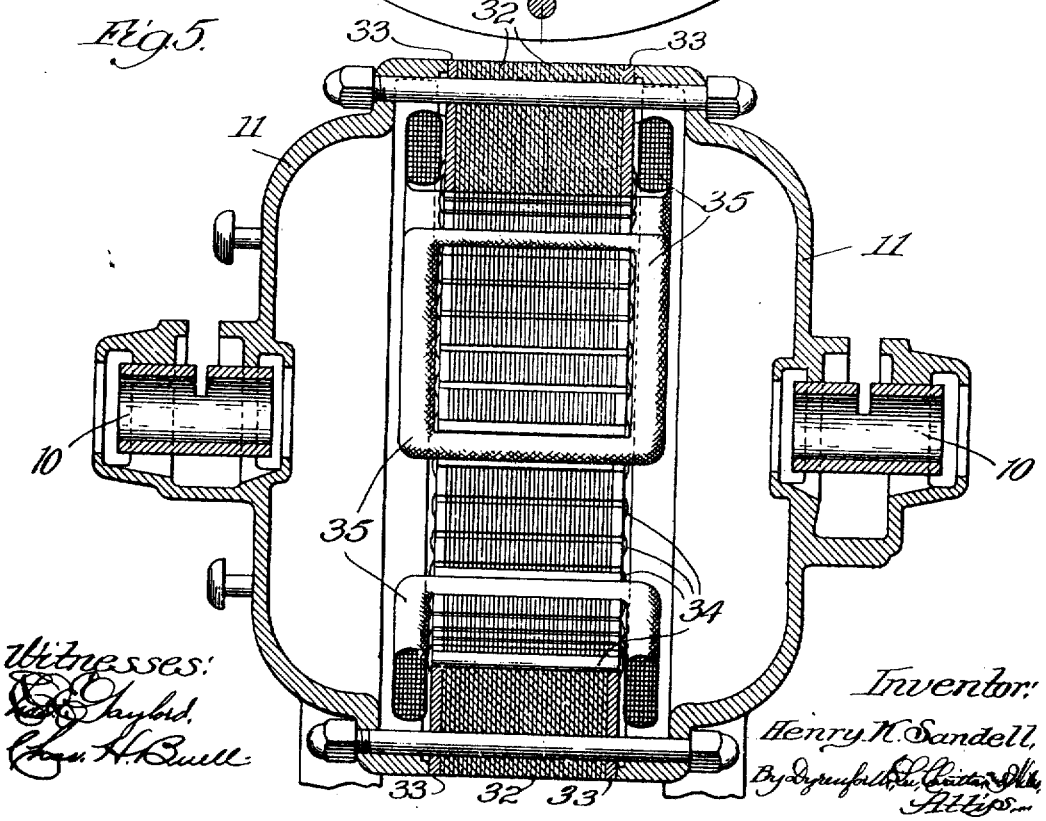

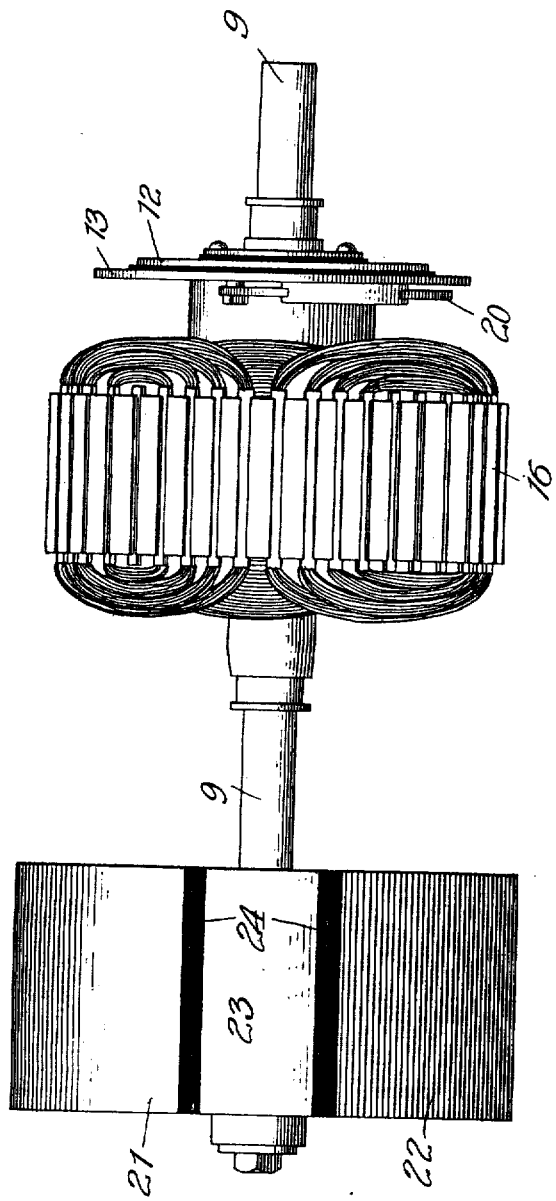

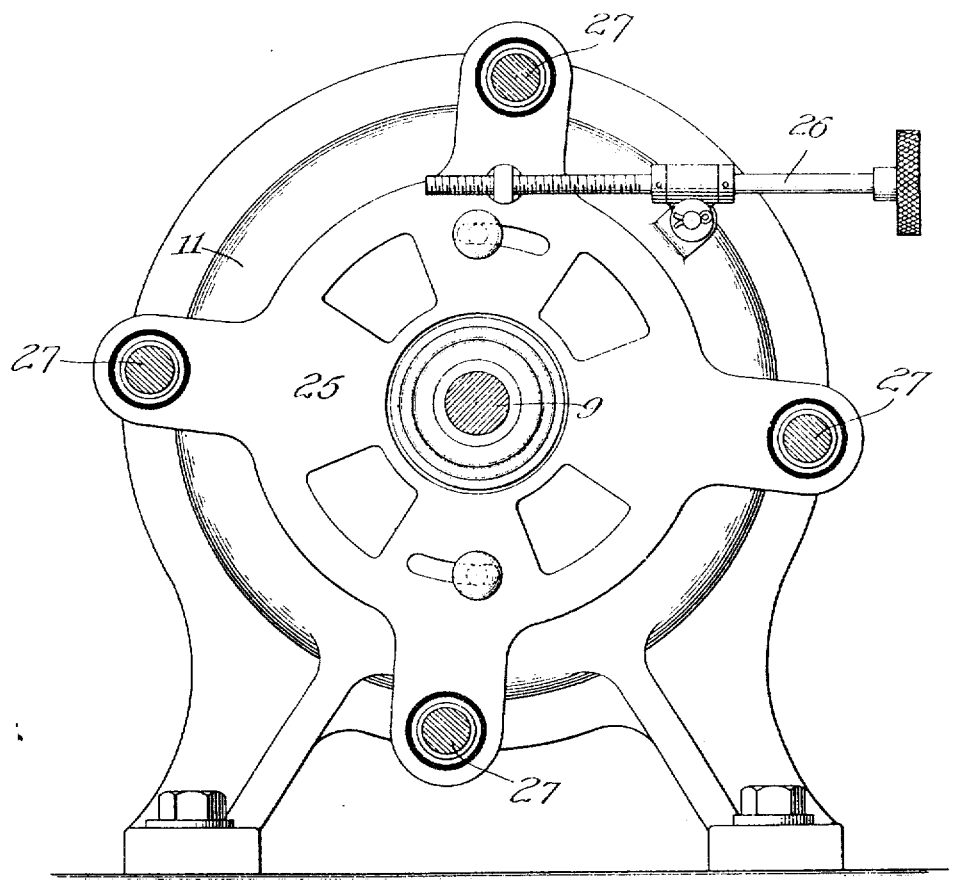

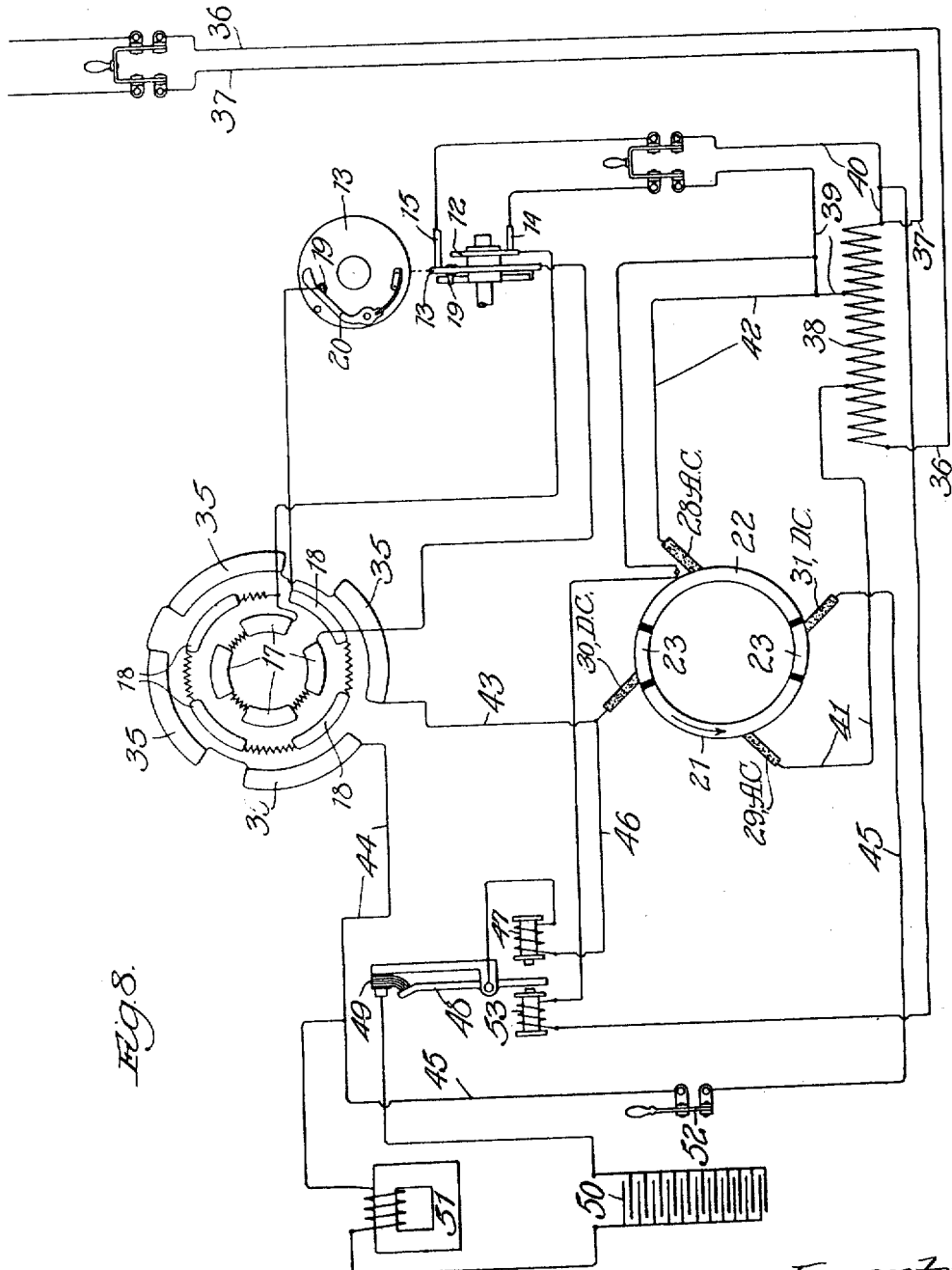

HENRY K. SANDELL, OF CHICAGO, ILLINOIS, ASSIGNOR TO HERBERT S. MILLS, OF CHICAGO, ILLINOIS.

RECTIFIER AND THE MOTOR THEREOF.

1,242,601. Specification of Letters Patent. Patented Oct. 9, 1917.

Application filed May 24, 1915. Serial No. 30,175.

*To all whom it may concern:*

Be it known that I, HENRY K. SANDELL, a citizen of the United States, residing at Chicago, in the county of Cook and State of Illinois, have invented new and useful Improvements in Rectifiers and the Motors Thereof, of which the following is a specification.

My invention relates to certain new and useful improvements in rectifiers and the motors thereof, and is fully described and explained in the specification and shown in the accompanying drawings, in which—

Figure 1:
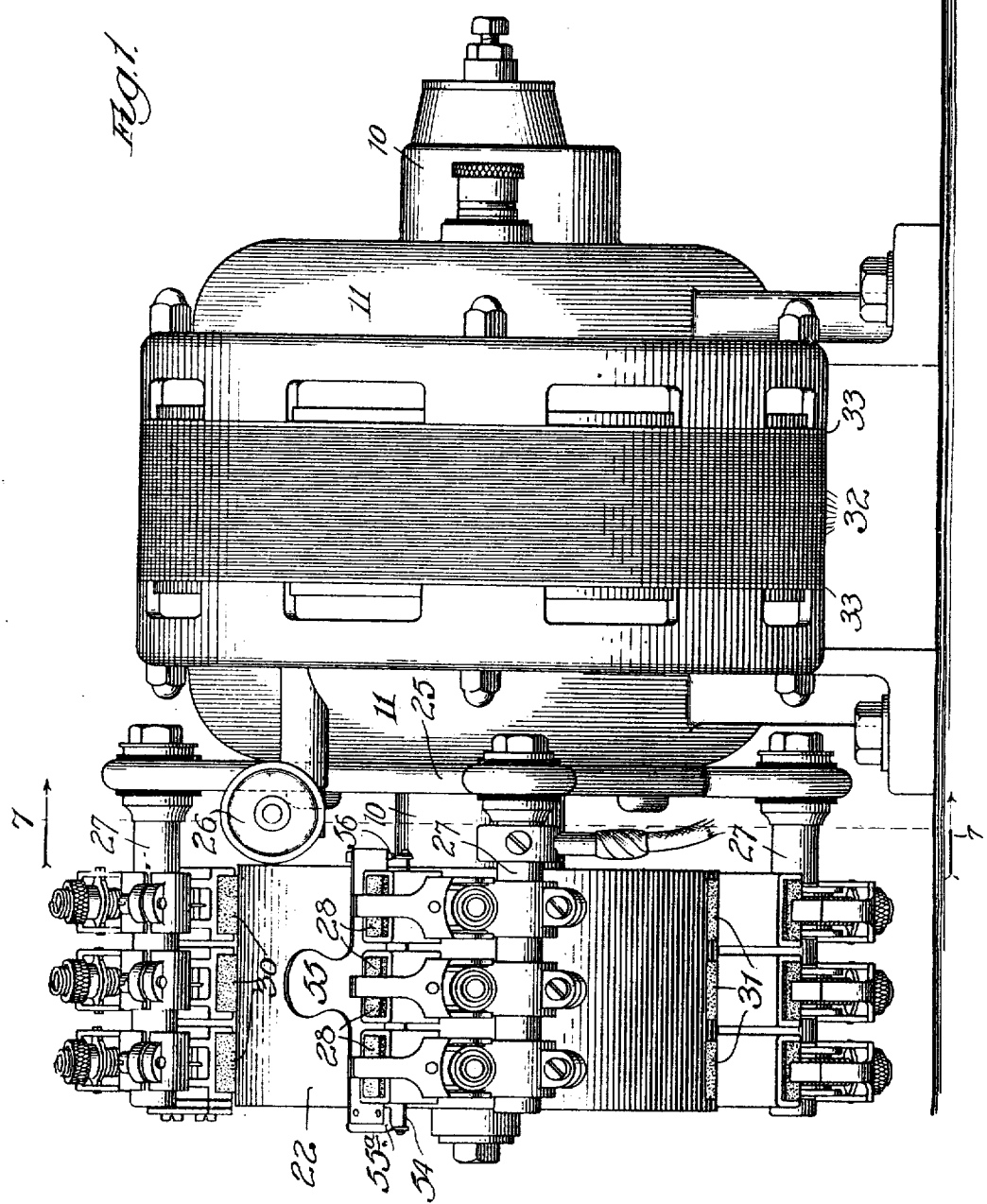
Figure 2:
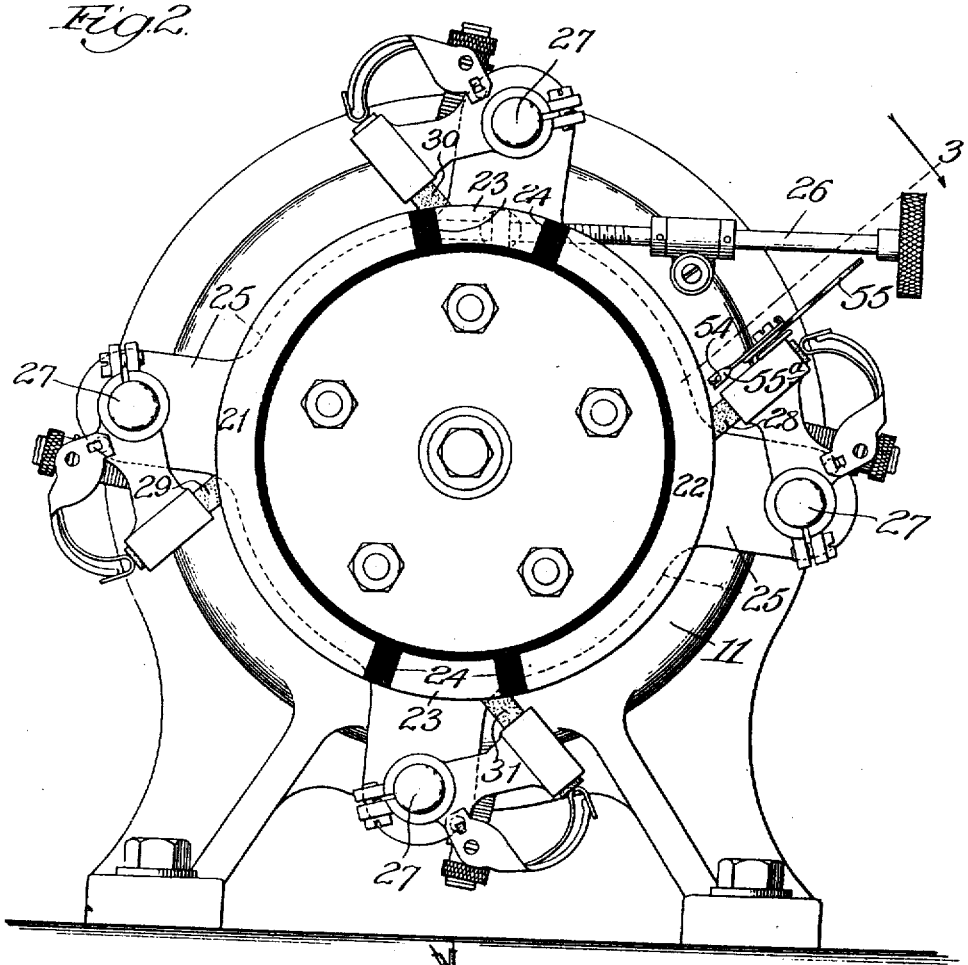
Figure 3:
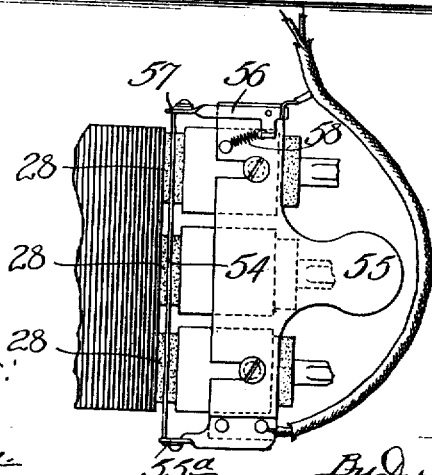

Figure 1 is a side elevation of my improved rectifier; Fig. 2 is an end view looking from the left of Fig. 1; Fig. 3 is a plan on the oblique line 3 of Fig. 2; Fig. 4 is an end view of the central part of the stator, the end cap being removed and the connecting bolts being shown in section; Fig. 5 is a central section on the line 5 of Fig. 4 with the end caps in position; Fig. 6 is an elevation of the rotor, its shaft and the commutator; Fig. 7 is a transverse section on the line 7 of Fig. 1, and Fig. 8 is a circuit diagram.

The present structure, in the broadest sense, includes a synchronous motor and a rectifying commutator driven thereby. The combination thus broadly defined is, of course, old. It includes, however, a novel motor construction which is peculiarly adapted for the special purpose of rectifying, a novel commutator structure, certain relations between the parts included in the circuit, which coöperate to produce novel results. In view of the necessity of describing the mechanical arrangement in some detail, as well as of explaining the electrical arrangement and its mode of operation and results, the device will be considered in the following order: I will first describe the rotor in detail, including the rotary commutator member. I will then explain the brush arrangement and its mode of operation, following this with the description of the stator of the motor. This will lead up properly to an explanation of the general mode of operation of the structure, in which reference will be made to the circuit diagram. There will then be left for description certain auxiliary appliances which appear on the circuit diagram, and are considered beneficial, but do not affect the broadest principles of operation of the rectifying apparatus.

The rotor and commutator.

Referring to the drawings, 9 is a shaft which extends from end to end of the structure, and which receives its support from and is journaled in bearings 10 in end-caps 11 mounted on the stator. The shaft 9 carries at one end slip-rings 12 and 13, to which alternating current is conducted from brushes 14 and 15 (Fig. 8). The arrangement of the magnetic bodies and windings of the rotor is of common form and requires no detailed description. That part of the rotor which is acted upon magnetically by the stator is generally indicated in the drawings by the character 16. It is provided with two windings (Fig. 8), a running winding 17, permanently connected to the slip-rings 12 and 13 to receive the alternating current, and a starting winding 18, one terminal of which is connected to the slip-ring 12 and the other of which runs to an insulated post 19 on the slip-ring 13. 20 is a centrifugally-operated switch mounted upon and electrically connected with the slip-ring 13, and, when the device is stationary, contacting with the post 19 so that current flows through the starting coils. When the motor reaches a given speed, centrifugal force throws out the switch 20 so as to cut off the starting coils in a well-known manner. No novelty is claimed for this rotor arrangement which is well known in the art as of satisfactory form, and is in constant use in small induction motors.

On the opposite end of the shaft 9 and beyond the left-hand end cap 11 of the motor is mounted the commutator. The commutator is of large diameter, larger in fact than the rotor. The importance of this feature of construction will hereafter appear. The commutator has two main segments 21 and 22, each of which, in the form shown, is of approximately 140° extent. There are thus left between the main commutator segments spaces of approximately 40° each, which perform no electrical function, and owing to their relatively large size they are filled by dead segments 23, insulating bodies 24 being interposed between the main and dead segments, as illustrated. The present motor is of the four-pole type, in which the rotor, when running synchronously, makes half as many turns as there are cycles e. g. in a sixty-cycle motor, the rotor has a speed of 1800 R. P. M. With a motor of this type the two-segment commutator is preferably, and is, in fact, required to embody certain points of my invention which relate particularly to the commutator construction.

*Commutator brushes and commutator operation.*

It will be seen in Fig. 2 that there are four brushes spaced 90° apart. These brushes are mounted upon and carried by an adjustable brush-carrying ring 25, a screw 26 being provided for adjusting the angular positions of all the brushes simultaneously. While I have spoken of the brushes as being four in number, this refers, of course, to the operative number of brushes. It will be seen from Fig. 1 that the brushes are mounted on insulated bars 27 and are arranged in groups of three on each bar. The number of brushes in each group, which are operatively and electrically a single brush, depends on the quantity of current to be rectified and the brush capacity thus necessitated. Of the brushes whose position and mechanical arrangement has been thus generally described, there are two A. C. and two D. C. brushes, the two of each sort being directly opposite each other, the A. C. brushes being indicated by 28 and 29 and the D. C. brushes by 30 and 31.

Attention may be called to the fact that the inclination of the brushes is the reverse of that usually employed, the brushes inclining so that the acute angle formed between them and a tangent to the commutator at their point of contact, lies on that side of the brush toward which the commutator moves as it rotates, the direction of rotation being indicated by the arrows in Fig. 8.

The present commutator is devoid of the usual slip-rings, and this is believed to be a novel form of commutator arrangement. The principal of its operation, perhaps, requires detailed explanation; and in the course of this description it will be understood that the motor is driving the commutator at the proper synchronous speed. The relatively broad dead segments, whose purpose will presently be explained, will also be ignored in this description, it being assumed that the main commutator segments are practically of 180° each, as they might be were it not for the accomplishment of the other purposes for which the dead segments themselves are intended. As the commutator rotates synchronously, each A. C. brush remains on a given main commutator segment for one complete cycle, and then passes to the adjacent main segment, upon which it also remains for a complete cycle. This reversing of the connections results in what may be termed half commutation between the A. C. brushes and the main commutator segments. In other words, while the difference in potential between the two A. C. brushes will be represented by the usual undulating sine curve, the difference in potential between the two main commutator segments will be represented by a sine curve, every other cycle of which is reversed, owing to the fact that the segments themselves have their connections with the A. C. brushes reversed each cycle. Therefore while one A. C. brush is positive to the other for half a cycle, then negative for half a cycle, positive for half a cycle, etc., as represented by the usual sine curve, one commutator segment is positive to the other for half a cycle and then negative to the other for half a cycle, whereupon the connections are reversed, and it is, therefore, negative for half a cycle, then positive for half a cycle. The connections are then again reversed, resulting in the same segment being positive and then negative. One commutator segment is thus positive to the other for an entire cycle, and then negative to the other for an entire cycle, and there is thus, in reality, half commutation between the A. C. brushes and commutator segments. The D. C. brushes being spaced 90° from the A. C. brushes, produce a further half commutation of an exactly similar character, which occurs just at the time when the commutator segments change in potential with reference to each other.

This mode of operation may be also understood by an inspection of Fig. 2, from which it will be readily observed that the A. C. brush 29 will be on the segment 21 for a whole cycle, during which we may say, for purposes of illustration, that the brush and the segment are first positive and then negative.

But during the first half of this cycle the commutator segment will make connection between the A. C. brush 29 and the D. C. brush 30, which will thus be rendered positive, and just before the change in polarity of the A. C. brush 29 and segment occurs the segment will run off the brush 30, and just after the change occurs it will run on to the D. C. brush 31. During the time when the D. C. brush 30 is getting positive current from the A. C. brush 29, the D. C. brush 31 will be getting negative current from the A. C. brush 28 through the commutator segment 22, and just as the change occurs in the A. C. brush 29 it will also occur in the A. C. brush 28 and segment 22, and the movement of that segment will deliver positive current from the brush 28 through the segment 22 to the D. C. brush 30. The D. C. brush 30 will thus continuously get positive and the D. C. brush 31 negative current.

This commutator arrangement is peculiarly simple because it permits the commutator to be made of the smallest possible longitudinal dimensions. In rectifying heavy currents a large brush surface is required, and this, of course, necessitates a commutator which is longitudinally of considerable extent. If the usual slip-rings were provided, the brushes would not be decreased in number, because there would have to be at least two A. C. and two D. C. brushes. But the D. C. brushes would have to be displaced longitudinally with respect to the A. C. brushes and this would require a commutator of approximately double the length of that here shown. Furthermore with a motor of the same speed there would have to be four instead of two segments and the number of breaking points on the commutator would be doubled.

The dead segments are employed in the present device for at least two purposes. The present rectifier is designed particularly for charging storage batteries, and it is desirable that the current delivered shall be at all times of higher potential than that of the battery. The current which is delivered by a rectifier is necessarily of the fluctuating type, and were there no dead segments the fluctuations would be from zero to the maximum supplied on the circuit, the maximum voltage being considerably higher than the rated voltage of the circuit. The low voltage portions of this fluctuating current are of no use in charging the battery, and they would be, in fact, positively detrimental, because, during these periods there would be a back flow from the battery, resulting in an increased cost and in sparking at the brushes. It is desirable to have the commutator cut-off occur at the moment when the line voltage approximately equals the battery voltage, and this is accomplished through the medium of the dead segments which eliminate the low voltage parts of the wave. The use of these broad segments also permits the separation of the main segments by such an absolute distance as to make it impossible for a brush to draw an arc from one segment to the other, regardless of how badly out of step the motor may get.

The use of dead segments of a sufficient size to secure this last result is rendered possible by making the commutator of the large size herein set forth. It has heretofore been customary to make the rectifying commutator of relatively small size compared to the rotor of the motor. This results in a relatively low peripheral velocity of the commutator, and requires relatively small separating spaces between the segments, with the result that conditions are admirable for the drawing of short-circuiting arcs. By the use of the very large commutator herein shown, the peripheral velocity is increased, resulting in a very quick break, and the wide spaces can be employed so that a short-circuiting arc is impossible. It may be suggested that the large commutator segment magnifies any deviation from perfect synchronism of the rotor. This is doubtless true, but the motor which I have devised, at least when connected up as hereinafter set forth, produces such perfect synchronism as to make it quite possible to employ the very large commutator satisfactorily. It is of course manifest that when perfect synchronism is established and maintained, much more delicate brush adjustment can be made with the large commutator, since the same absolute variation produces a relatively small angular variation, which is the important point in commutation.

*The stator and its connections.*

In its mechanical construction, the stator of my motor is quite similar to that commonly employed in induction motors of the squirrel-cage stator type. The stator is composed of a soft iron annulus formed of separate laminæ 32. On its opposite faces are copper plates 33 electrically connected together by heavy longitudinally-extending copper bars 34. This portion of the stator alone and by itself makes, when associated with the rotor, a thoroughly satisfactory induction motor of ample power to carry the entire required load, i. e., the frictional load of the commutator, at substantially synchronous speed, the slip being very low indeed. For the purpose, however, of obtaining complete synchronism, the stator is provided with localized poles. These are provided by the construction best shown in Figs. 4 and 5. The iron forming the magnetic body of the stator is notched between adjacent pins to form four pairs of radial slots. The copper plates 33 are, of course, similarly notched and care is taken that the bars 34 on the two sides of these notches are cut away no more than is necessary. In the slots thus formed are wound synchronizing coils 35. There is thus produced a field which is structurally that of the squirrel-cage induction motor and which produces a motor which synchronizes with unusual accuracy. It is perhaps unnecessary to discuss the electrical and magnetic fluctuations in this stator. There is clearly a coöperative inductive relation between the bars of the squirrel-cage and the coils, more especially since the slightest tendency for the motor to get out of synchrony results in setting into action a relatively powerful inductive field. The arrangement here shown, where the field coils practically surround the inductive bars, produces a relation where their inductive action upon each other is peculiarly effective, and particularly with the connections hereinafter set forth the result is highly advantageous.

*The circuit and general mode of operation.*

Referring now to Fig. 8, current is supplied through mains 36 and 37 to an auto-transformer 38. Current is taken out from the auto-transformer through leads 39 and 40 to the brushes 14 and 15 which supply the rotor. Current is led to the A. C. brushes 28 and 29 which bear on the rectifying commutator through leads 41 and 42. The auto-transformer is preferably of such form that the voltage may be varied to bring it to a point only slightly above that of the battery which it is desired to charge. The D. C. brush 30 is connected to two leads, one of which, 43, is connected to one terminal of the synchronizing coils of the stator. The other terminal of the synchronizing coils is connected to a wire 44 in turn connected by a wire 45 to the D. C. brush 31. Current flows through the other lead 46 from the D. C. brush 30 to the overload releasing coil 47 of an over-and-under-load circuit-breaker, thence to the switch 48 of the circuit-breaker through a contact 49 thereof and thence to one terminal of the battery 50. The other terminal of the battery is connected to an impedance coil 51, the opposite terminal of which is connected to the wire 45. A switch 52 controls the flow through the wire 45. The battery and overload circuit-breaker thus together form one branch of the circuit between the D. C. brushes, while the synchronizing coils are in parallel therewith in the other branch.

The circuit-breaker is maintained closed, under normal conditions, by a magnet 53 occupying the position in the circuit-breaker of the ordinary underload releasing coil. This magnet is supplied with current which passes through an independent line from the transformer, the line being in parallel with the rotor of the motor. A fuse 54 is in series with the under-load magnet 53, so that if the fuse is blown the circuit-breaker opens. The exact construction and arrangement of this fuse will hereinafter be explained, it being only necessary now to say that it is placed adjacent to one of the brushes in the zone of possible sparking, so that it will be blown by the heat applied to it from without should the motor fall out of step sufficiently to produce serious sparking at the brushes.

The general operation of the rectifying and battery-charging system requires some additional explanation. It is to be observed that the synchronizing coils of the motor receive rectified current which is necessarily of a pulsating character. I have found that there is a distinct difference in the operation of the motor when supplied with such current, the synchronism being more nearly perfect than when the synchronizing coils are supplied, as they might be, with direct current of constant voltage. It is unnecessary to speculate on the causes which produce this result. It is manifest, of course, that synchronizing coils in the midst of an inductive field, such as that here present, must produce a distinctly different effect when magnetized by a pulsatory current than when magnetized by a continuous current, and experiments have demonstrated the superior synchrony of the motor receiving the pulsatory current. It has been clearly established by long continued practical use that the present motor will run for a long period of time, and carry very heavy currents with no noticeable brush-sparking. The use of the impedance coil 51 is helpful in this regard, since it is made of a form which will permit the ordinary fluctations of the current, occurring at the speed at which they occur in practice, to pass through without serious interruption. But should the point of commutator cut-off fall below that of the battery potential, there will be a very brief instant when a current of very low voltage will tend to flow backward. This impulse, in the very nature of things, must be during the briefest fraction of a cycle, and the impedance coil is sufficient to prevent this back flow.

It will be evident that the superior results of the present arrangement are due to a plurality of causes. The motor itself is so constructed as to partake, in the main, of the properties of a well-designed induction motor, and the entire induction effect is available to prevent the motor getting out of synchronism. This is accentuated by the fact that the synchronizing coils receive direct current, whose voltage fluctuates synchronously, and the inductive relation between the coils and the inductive part of the stator is such as to make this fluctuation of peculiar importance. The commutator arrangement is peculiarly simple, as hereinbefore explained, and it gives rise to a current, the graphic curve of which would have a series of gaps between the fluctuations of higher potential, so that there are no periods when the battery has an opportunity to be substantially short-circuited through the supply mains. The impedance coil appears to take care of any slight tendency to back flow which might occur owing to the motor being slightly out of synchrony, or owing to changes in the battery potential as the same becomes more fully charged, and consequently approaches the applied voltage.

The high peripheral velocity of the commutator has an important coöperative bearing on the action of the impedance coil, since the high velocity produces a very rapid break, thereby not only decreasing the time during which there is a theoretical tendency of the back flow from the battery to occur, but also very quickly interrupting the spark which it is the natural tendency of the impedance coil to prolong. With a slower commutator break it would be necessary, in order to secure the same result of preventing back flow, to use a larger impedance coil, which in itself would decrease efficiency, and which would also tend to increase sparking. The high commutator velocity thus permits a relatively small impedance coil to perform all the desired work in a thoroughly satisfactory manner.

The rectifier is, of course, of the self-starting type, which is highly convenient in operation, this being due to the fact that the motor is essentially of the induction form, and is so designed with respect to its load that it can come up practically to synchrony as an induction motor. When it has established nearly synchronous speed, the current flowing from the D. C. brushes will reverse only at relatively long intervals, and the current can then be thrown through the synchronizing poles and will produce immediate synchrony. In practice, the initial current is thrown through the synchronizing coils from the battery, by closing the circuit-breaker. The motor at once falls into synchronism and in such a relation to the battery that the current flowing from the D. C. brushes is of the polarity required to charge the battery. This is because the polarity of current flowing from the D. C. brushes depends entirely on the polarity of the poles of the field, the polarity of the rectified current being reversed should the rotor drop back 90° at any time. The present device, therefore, is of a construction which will automatically give current of the correct polarity for battery charging whatever may be the battery connections. If, for instance, before the switch 52 was closed, the battery connections were reversed, the rotor would simply drop back 90°, thereby reversing the polarity of the rectified current. After synchronism has been established in this proper relation, the switch 52 is closed and the rectified current flows through the battery and charges it.

It may be suggested that during the periods when the D. C. brushes are on the dead segments of the commutator, the battery current will tend to flow through the synchronizing coils, and thus interfere with their magnetic pulsations. This, however, is prevented by the impedance coil in which the flow of current would have to reverse its direction to produce this result. During the brief time when the brushes are on the dead segments, the current will be prevented from reversing by the impedance coil. The satisfactory operation of the device is furthered by the fact that the rotor and commutator receive current from the same auto-transformer, but not from the same leads thereof. The same result might be accomplished by the use of a standard form of transformer, provided the rotor and commutator derive their current from different parts of the same secondary coil. With the present arrangement, any increase in the load on the D. C. side of the commutator, which would tend to produce lagging in the transformer, necessarily results in a corresponding lag in the rotor current. The present arrangement is preferable to one where the rotor and commutator derive current from the same circuit, for in the latter case an increase in load on the commutator would cause a voltage drop in the rotor, which would be undesirable. Furthermore, the action of the battery would tend to upset the form of the wave in the entire circuit, which would seriously impair the operation of the motor, particularly by heating the rotor. This is because the tendency would be for the battery to cut down the high voltage parts of the wave and to build up the low voltage parts of the wave by its re-action thereon, so that the wave would vary from the typical and proper form toward the straight line form.

*The fuse and its mountings.*

It has heretofore been stated that the fuse 54 is in an independent circuit, and carries no part of the working current. It lies, however, in the zone of possible sparking, its mechanical construction and arrangement being shown in Figs. 2 and 3. One of the brush-holders carries a removable plate 55, at one end of which is mounted a rigid fuse-holder 55ª. On the opposite end of the plate 55 is a pivoted fuse-holder 56, to one end of which, 57, the end of the fuse is attached. A spring 58 operates constantly on the pivoted fuse-holder to hold the fuse under tension. The fuse is adjacent to the end of the brush and on that side thereof toward which the commutator rotates. As a result, therefore, if the motor gets out of step and sparking at the brushes commences, the arc which is drawn will envelop and instantly destroy the fuse, thus interrupting the current in the circuit of which the fuse is a part causing the circuit-breaker to open, as hereinbefore explained. It will be evident that this fuse arrangement is capable of great variation, although it is most convenient to have the fuse form in itself a part of an electric circuit, but since its heat is derived from without, instead of being derived from within, this arrangement is not essential, the important point being that the fuse shall be in position to be destroyed by the sparks drawn, and that it shall be mechanically or electrically connected to open such circuit as will protect the commutator and brushes. In the present instance the D. C. working circuit, *i. e.*, the circuit through the battery, is the one opened, and this reduces the current to such a small quantity that the commutator cannot be injured but it will be evident that the same result would be accomplished were the entire circuit through the commutator and brushes interrupted on either side of the commutator and brushes.

I realize that considerable variation is possible in the details of the construction herein shown, and I do not intend to limit myself thereto, except as pointed out in the following claims, in which it is my intention to claim all the novelty inherent in the device as broadly as is permitted by the state of the art.

What I claim as new and desire to secure by Letters Patent is:

1. In a rectifier, an alternating current motor having two field windings in inductive relation to each other, one of said windings being short-circuited upon itself, a rectifying commutator driven by the motor, and means for conducting pulsating direct current from the commutator to the other of said field windings.

2. In a single phase rotary rectifier, a motor having two field windings in inductive relation to each other, one of which is short-circuited upon itself, a commutator driven by the motor to transform the single phase current into pulsating direct current, and means to conduct said pulsating direct current to the other of said field windings.

3. A rotary rectifier having, in combination, a primary motor member fed by alternating current, a secondary motor-member having two windings, one of which is short circuited, a rectifying commutator, and means to lead the pulsating direct current delivered by the commutator to the other winding of the secondary motor member.

4. A rotary rectifier having, in combination, a commutator for transforming alternating current into pulsating direct current, a motor for driving the commutator, comprising a primary member receiving alternating current, a secondary member having a short circuited induction winding, and another winding in inductive relation thereto and supplied with rectified current from the commutator.

5. A rotary rectifier having, in combination, a commutator for transforming alternating into pulsating direct current, a motor for driving the commutator, said motor comprising a primary member receiving alternating current and a secondary member consisting of a magnetic annulus, conducting plates on the sides of the annulus, transverse conducting bars connecting the plates and in close proximity to the primary member and a winding lying in notches in the annulus between the transverse bars, and means to conduct the pulsating direct current to said winding.

6. A rotary rectifier including a commutator and a motor for driving the same, said motor consisting of a primary member and a secondary inductive member, the two together forming an induction motor of the full power required to drive the commutator substantially to synchronism, operating as an induction motor, the secondary member of the motor having in addition separately energized coils to establish localized poles to hold the motor in synchronism.

7. A rotary rectifier comprising, in combination, a commutator and a single phase motor for driving the same, said motor having starting coils in its primary member and being so designed as to run substantially to synchronism as an induction motor, the secondary member being further provided with separate windings to establish localized poles to hold the motor in synchronism.

8. A rotary rectifier adapted for battery charging and comprising a synchronous motor, means for supplying alternating current to one member of the motor, a rectifying commutator, coils in the other member of the motor, connections between the commutator-brushes and said coils to supply pulsating direct current to said coils, battery-charging leads connected to the brushes of the commutator in parallel with the coils, and an impedance coil in series with the battery operating to temporarily prevent the flow of battery current into said coils.

9. A rotary rectifier adapted for battery charging, comprising two relatively rotatable members, means for conducting alternating current to one member, a commutator driven by the motor, coils in the other motor member, means for conducting rectified current thereto, battery-charging leads, and means for conducting battery current to the said motor-coils in parallel with the commutator, for the purpose of establishing synchronism and predetermining the polarity of the resultant rectified current.

10. A rectifying system comprising a transformer and a plurality of circuits supplied thereby, the transformer being designed to produce similar phase displacements in its several circuits, a rectifying commutator and a motor driving the same, the motor being in one of the transformer circuits and the commutator in another, whereby phase displacements in the rectified circuit which would tend to produce variations in potential at the moment of commutator cut-off are compensated for by corresponding changes in the motor circuit which vary the time of commutator cut-off.

In testimony whereof I have hereunto set my hand and affixed my seal this 21st day of May, A. D. 1915.

HENRY K. SANDELL. [L. S.]

In presence of two subscribing witnesses:
O. C. AVISUS,
K. O'NEILL.

Copies of this patent may be obtained for five cents each, by addressing the "Commissioner of Patents, Washington, D. C."